Oct. 25, 1949.  R. M. MAINS  2,485,977
STRESS MEASURING DEVICE
Filed March 11, 1946　　　　2 Sheets-Sheet 1
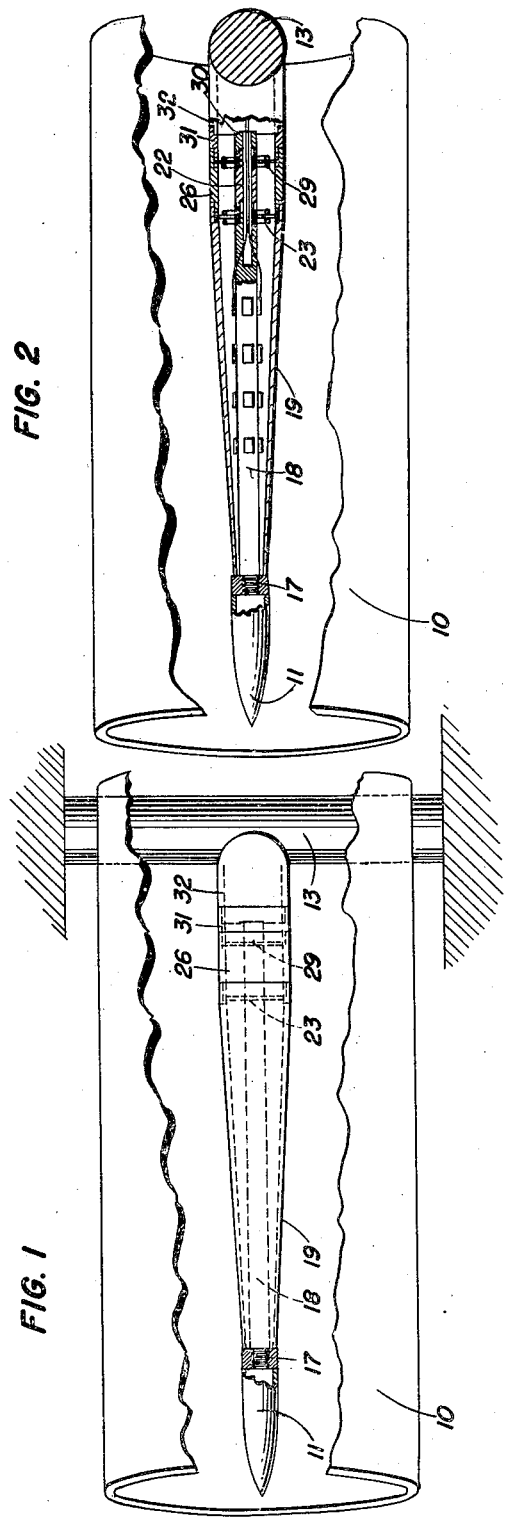
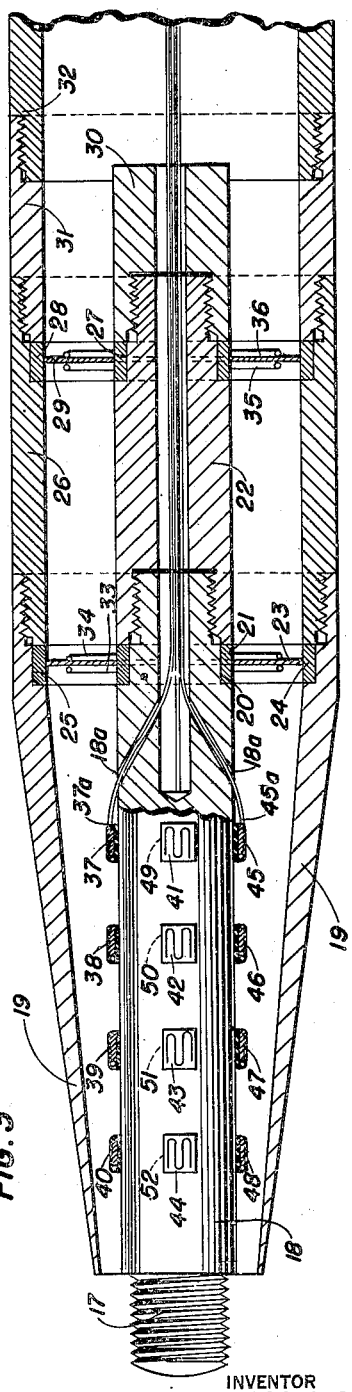
INVENTOR
ROBERT M. MAINS
BY
ATTORNEY Oct. 25, 1949. R. M. MAINS 2,485,977
STRESS MEASURING DEVICE
Filed March 11, 1946 2 Sheets-Sheet 2
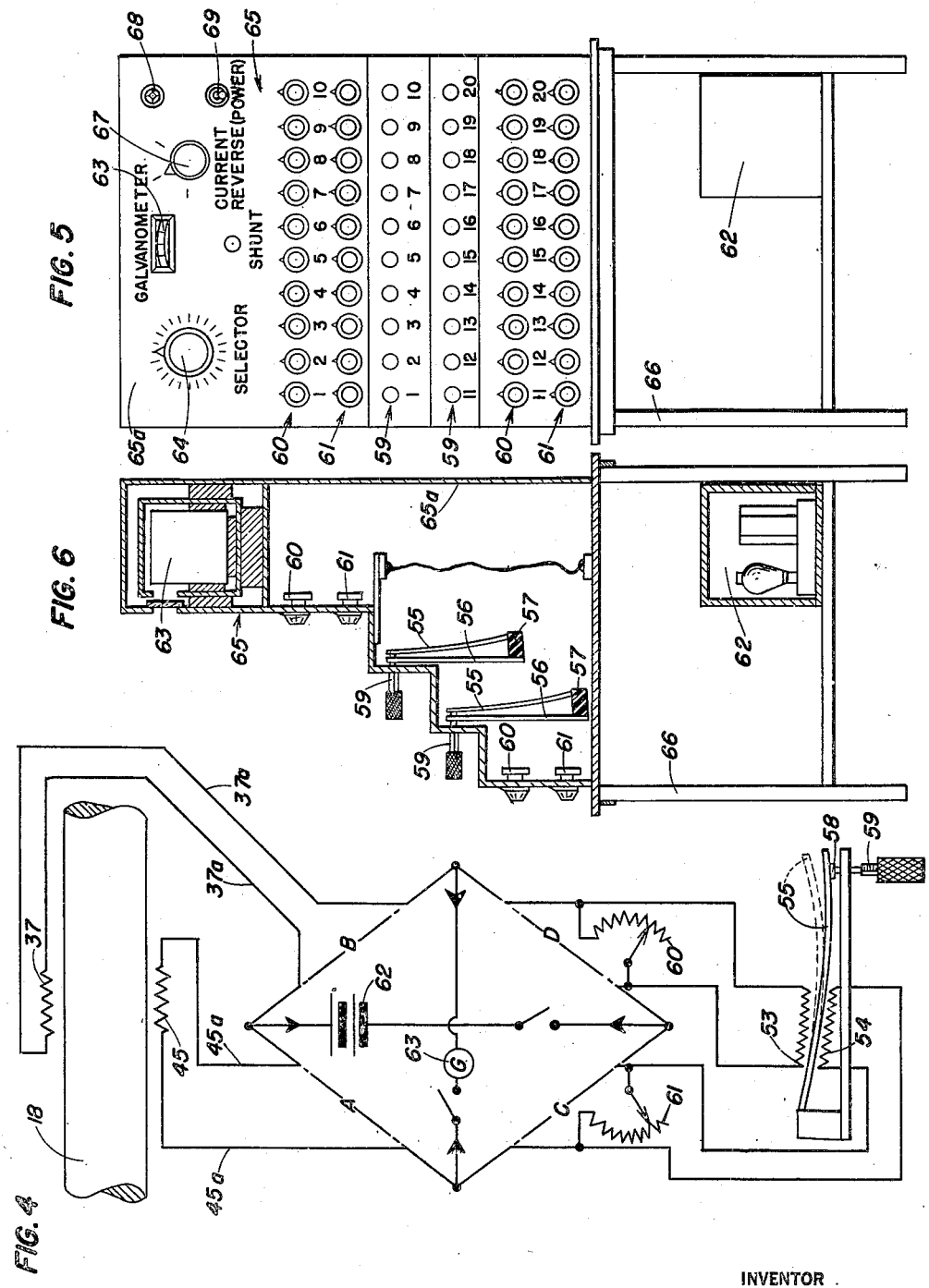
INVENTOR
ROBERT M. MAINS
BY
ATTORNEY Patented Oct. 25, 1949

2,485,977

UNITED STATES PATENT OFFICE 2,485,977

STRESS MEASURING DEVICE

Robert M. Mains, Silver Spring, Md., assignor to the United States of America as represented by the Secretary of the Navy Application March 11, 1946, Serial No. 653,490

7 Claims. (Cl. 73—147)

This invention relates to stress measuring means primarily designed for use in observing the performance of test bodies in a fluid current.

One object of the invention is to provide a means for measuring and determining the effect of a fluid current on a test body such as a projectile, the measuring means being entirely electrical in operation and being adapted to give very exact readings of stresses of very small magnitude.

Another object of the invention is to provide a novel means for adapting "SR-4" type bonded resistance wire strain gages for use in determining the behavior of a body such as a projectile in a fluid current.

Another object of the invention is to provide a measuring device for use in testing the behavior of a body such as a projectile in a fluid current, which has a minimum effect on the fluid current used in the testing device and which is in turn not affected by the fluid current.

These and other objects of the invention will be apparent from the following specification and the accompanying drawings, in which:

Fig. 1 is a fragmentary diagrammatic plan view of a wind tunnel provided with testing means constructed in accordance with the present invention, showing a test body mounted therein, with part of the wind tunnel shell being broken away;

Fig. 2 is a longitudinal sectional view of the device shown in Fig. 1;

Fig. 3 is a longitudinal sectional view of the test body support showing the strain gages carried thereby, certain parts being shown in elevation and others broken away;

Fig. 4 is a diagram of a circuit used in the testing apparatus;

Fig. 5 is a front elevational view of the operating panel of the apparatus;

Fig. 6 is a cross sectional and partly diagrammatic view of the operating panel showing some of the elements contained in the circuit of Fig. 4.

As a stress sensitive element, "SR-4" type bonded resistance wire strain gages are utilized. The sensory means employed in gages of this type consists of resistance wire attachable to the element in which the stresses exist so that the resulting strains in the element deform the wire and thereby alter its electrical resistance. For example, a piece of wire cemented firmly to the face of a flat piece of metal will partake of any flexure thereof, and due to changes in length, cross section, and/or molecular structure of the wire, will suffer changes in resistance which are functions of the strains in the flat piece of metal. Since strain is proportional to stress, the imposed stress may thus be determined. Gages of this type are manufactured commercially by the Baldwin Locomotive Works, Baldwin Southwark Division, and are described in the Baldwin Locomotive Works, Baldwin Southwark Division, Philadelphia, Pennsylvania, News Letter, volume 1, No. 2, for October 1944, entitled "SR-4 News Letter" and in the Bulletin No. 179 entitled "The SR-4 bonded resistance wire strain gage," published by the same company. The details of such gages are also disclosed in Patent No. 2,292,549.

Referring to the drawings, the numeral 10 represents a wind tunnel in which is mounted a test body 11 which is screwed onto the threaded end 17 of the supporting rod 18. The rod 18 is surrounded by a tubular shield 19 which prevents the air currents from striking the rod 18 and setting up possible stresses which would give erroneous readings.

The rod 18 is supported within the shield 19 as follows: At its rear end, the rod 18 has a shoulder 20 of reduced diameter upon which fits a ring 21. Beyond the shoulder 20, the rod is threaded to receive a corresponding threaded tube 22 which, when mounted on the end of rod 18, secures the ring 21 firmly in place.

An annular diaphragm 23 extends outwardly from the central ring 21 and carries on its outer periphery an outer ring 24. The outer ring 24 is clamped in a groove 25 in the shield 19 by means of a threaded tubular extension 26 of said shield corresponding in length to the tube 22.

At the rear ends of the tubes 22 and 26, similar joint constructions are provided to hold a pair of rings 27 and 28 which support a diaphragm 29. A short tubular nut 30 holds the ring 27 against the end of tube 22 while a short tubular section 31 similarly holds the outer ring 28 in place. A tubular section 32 is then threaded onto the rear end of section 31 and is suitably supported in a rigid manner by a cross member 13 which extends transversely of the wind tunnel. The rod 18 is thus supported within the shield 19 by diaphragms 23 and 29 which permit axial movement of the rod 18 as a whole while preventing any transverse movement thereof.

As the rod 18 has an over-all length of approximately 2 feet, it is bent somewhat by the transverse forces produced by the air current on the body under test. The axial yield and transverse yield of the rod 18 are measured by means of the resistance wire strain gages as will now be described to determine wind resistance and yaw, respectively, of the test body.

Cemented or otherwise securely attached throughout its length to each face of each of the diaphragms 23 and 29 is a substantially circular resistor 33, 34, 35 and 36. A total of four resistors are thus provided. They are of uniform diameter and arranged in pairs as shown, concentric with the rod 18 and located on opposite sides of the diaphragms.

Other wire strain gages comprising straight resistors are shown at 37 to 52, inclusive, and are similarly secured about the periphery of the rod 18 extending longitudinally thereof, at a plurality of points along its length. These are arranged in sets of four disposed in spaced quadrature at several points along the length of the rod 18. As shown in Fig. 3, the resistors 37, 38, 39 and 40 are on the upper surface of the rod 18, resistors 41, 42, 43 and 44 are on the front surface of the rod, resistors 45, 46, 47 and 48 are on the lower surface of the rod, and resistors 49, 50, 51 and 52 are on the rear surface of the rod. Electrical leads from the various resistors are passed rearwardly along the outer surface of the rod 18 and through openings 18a in the rod which communicate with the central bore of the tubular elements 22 and 30 and the extension of said bore in the rear end of rod 18. For purposes of clarity, all of the leads are not shown, however, the lead 45a from the resistor 45 and lead 37a from gage 37 are shown for illustrative purposes. Leads (not shown) from gage 36 are carried into the central bore through one of the openings 18a while leads (not shown) from gages 34 and 35 pass into the bore through an opening (not shown) in tube 22.

The resistors are well insulated by any suitable coating such as Bakelite, and are firmly secured to, but insulated from their supports by means of a cement of a suitable nature.

In order to measure strains of the rod 18, the wires from the various resistors are connected into electrical circuits, a sample of which is shown in Fig. 4. A separate circuit is provided for each of the opposite pairs of resistors. The typical circuit shown in Fig. 4 includes a Wheatstone bridge indicated by the diamond shaped figure ABCD with a direct current power source 62 connected in one diagonal and a galvanometer 63 in the other diagonal. As shown, the sample circuit includes the two resistors 37 and 45 and these resistors are shown in the arms B and A respectively, of the bridge. For purposes of example assume that resistors 37 and 45 each have a resistance of approximately 120 ohms.

Another pair of resistors of approximately the same resistance, 53 and 54, are cemented to the opposite faces of a metal strip 55 which is rigidly mounted at one end and at its other end is engaged by the tip 58 of a micrometer 59 which is operable to deform the strip as shown by the dotted lines. The resistors 53 and 54 comprise the arms D and C respectively of the Wheatstone bridge so that they balance the resistors 37 and 45 as the metal strip 55 is deformed by operation of the micrometer 59. When a balance is achieved as indicated by the galvanometer, the amount of linear deflection of the end of strip 55 is determined by reading the micrometer 59 which is calibrated in the desired units.

In order to compensate for unavoidable differences in resistors, variable resistors 60 and 61 are connected in parallel with the resistors 53 and 54, respectively. These variable resistors 60 and 61 are of relatively high resistance such as approximately 10,000 ohms maximum, and are adjustable so that the bridge balances at any suitable zero reading of the micrometer.

Due to the fact that the variations of the resistors 37 and 45 are relatively small and could be easily masked by accidental variation in the bridge circuit, such as those which could be introduced by the contact resistances of switches or the like, each bridge is made a permanently wired and soldered circuit as far as its arms A, B, C and D are concerned. The only switching which is done in each of the Wheatstone circuits is the switching in and out of the power supply and the galvanometer circuits.

As best shown in Figs. 5 and 6, a suitable control panel 65 is provided in a cabinet 65a which is mounted on a table 66. The table 66 also supports a power supply 62.

The panel includes a selector switch 64 for connecting the power source 62 and the galvanometer 63 into the any particular Wheatstone circuit to be measured. The micrometer heads are shown in Figs. 5 and 6 by the horizontal rows marked 59 while the initial balance variable resistors 60 and 61 are also located in horizontal rows as indicated. A switch 69 controls the power supply 62 and a pilot light 68 indicates when the power is on. A current reversing switch 67 permits successive measurements on both polarities of the bridge to eliminate errors as is conventional in Wheatstone bridge manipulations.

In operation, a test body is mounted on the screw 17 positioned in the wind tunnel and the various variable resistors 60 and 61 are adjusted for each circuit to balance each Wheatstone bridge independently and thereby arrive at a predetermined zero setting of each of the micrometer heads 59. By adding known weights or other known stresses to the model and rebalancing the various Wheatstone bridge circuits by means of the micrometer heads, a check calibration is made and the forces corresponding to the various micrometer readings are determined.

After this procedure is completed, the wind making apparatus such as a propeller (not shown) mounted in the forward ends of the wind tunnel is set into motion and the various micrometers 59 are adjusted to balance the resistors on the flexible plates 55 against the resistors within the wind tunnel, the selector switch 64 being utilized to switch from one set of resistances to the next set to connect the various pairs of resistances and Wheatstone bridges in the wind tunnel to the galvanometer and power supply.

As the various pairs of resistors are evenly spaced along the rod 18, the strains in each set should theoretically be linear with the distance from the center of pressure on the device under test. By plotting the readings as ordinates against distances along the rod as abscissae, the center of pressure on the projectile or other test body will be indicated by the location at which the resulting line on the graph, which should be straight, crosses the axis of abscissae.

Any abnormal deviation of one of the readings will be evident immediately from the plots and the reading in question may be discarded as erroneous. In order to increase the reliability of the measurement for the center of pressure on the test body, a larger number of pairs of resistors may be used.

By noting the readings from the strain gages mounted on the diaphragms 23 and 29, the amount of axial stress of the rod 18 may be measured, giving an indication of the wind resistance of the body being tested.

It is obvious that I have explained only a preferred embodiment of the invention and only a few of the measurements which may be made by means of the invention. For example, if recording of the results of strain measurements is desired, the resistors 53 and 54 may be placed on the beam 18 adjacent the resistors 37 and 45 (see Figure 4). In this arrangement, the galvanometer 63 would be replaced by a suitable recording device, such as a recording potentiometer or a recording string galvanometer. This arrangement also permits better compensation for temperature changes experienced by the gages during operation. The invention is not limited to testing projectiles but may be extended to aircraft or other test bodies and may be also used in other fluid currents besides air such as for testing ship hulls or other bodies in water or other fluids.

I claim:
1. Apparatus for examining the behavior of a test body in a fluid current, comprising a test body supporting rod, a tube surrounding said rod and spaced therefrom, means for supporting said rod at one end within said tube, whereby a test body may be mounted upon the free end of said rod exposed to the on-coming fluid flow, means for rigidly supporting said tube in said fluid current, and electrical means for measuring the strain of said rod caused by impingement of the fluid current on the test body.

2. Apparatus for examining the behavior of a test body in a fluid current, comprising a tubular member mounted in said fluid current, a diaphragm mounted within said tube, a test body supporting rod carried within said tube by said diaphragm and having a free end projecting from the tube for mounting a test body thereon, resistance wire strain gages carried by said diaphragm and by said rod, and electrical measuring circuits connected with said gages for indicating distortion of said rod and said diaphragm caused by the impingement of the fluid current upon said test body.

3. Apparatus for examining the behavior of a test body in a fluid current, comprising a tubular member mounted in said fluid current, a test body supporting rod suspended at one end within said tubular member and arranged to receive a test body thereon at the opposite end and position said body in contact with said fluid current, a pair of resistance wire strain gages attached to opposite surfaces of said rod, and an electrical measuring circuit connected with said gages for indicating distortion of said rod caused by impingement of the fluid current upon said test body.

4. Apparatus for examining the behavior of test body in a fluid current, comprising a tubular member mounted in said fluid current, a test body supporting rod suspended at one end within said tubular member and arranged to receive a test body thereon at the opposite end and position said body in contact with said fluid current, a plurality of pairs of resistance wire strain gages spaced along said rod and attached thereto, the gages comprising each pair of gages being positioned 180° apart on the periphery of said rod, and an electrical measuring circuit connectable to each pair of gages for determining the amount of distortion of said tube at the points of attachment of said gages, whereby phenomena associated with the impingement of fluid current on said body are ascertained.

5. An instrument for measuring forces exerted by a fluid current on a device immersed in said fluid, comprising an elongated flexible member rigidly held at one end and at its other end supporting the device under test, a pair of electrical resistors located opposite each other on said member, whereby one becomes extended and the other compressed whenever the flexure of the member has a component in the plane of the resistors, and means for measuring the resistance changes of said resistors when thus stressed.

6. An instrument as defined in claim 1, wherein there are two pairs of resistors, located in perpendicular planes.

7. A measuring instrument for examining the effect of a fluid current on a test body, comprising a flexible arm supported rigidly at one end in line with the fluid flow and having means for carrying said body at its other end, a testing gage cooperating with said arm, and a faired spaced shield surrounding the flexible arm to protect it from direct contact with the fluid current, said shield extending from the fixed end of the flexible arm to a point just clear of the body under test.

ROBERT M. MAINS.

REFERENCES CITED

The following references are of record in the file of this patent:

UNITED STATES PATENTS

| Number | Name | Date |
|---|---|---|
| 1,710,135 | Zahm | Apr. 23, 1929 |
| 2,213,982 | Frey | Sept. 10, 1940 |
| 2,252,464 | Kearns, Jr., et al. | Aug. 12, 1941 |

FOREIGN PATENTS

| Number | Country | Date |
|---|---|---|
| 11,765 | Great Britain | 1902 |
| 490,483 | Great Britain | Aug. 16, 1937 |